Sept. 14, 1954 J. G. HOLDENRIED 2,688,985
ORIFICE FITTING DEVICE AND STRAIGHTENING
VANE UNIT ASSEMBLY
Filed Aug. 20, 1951
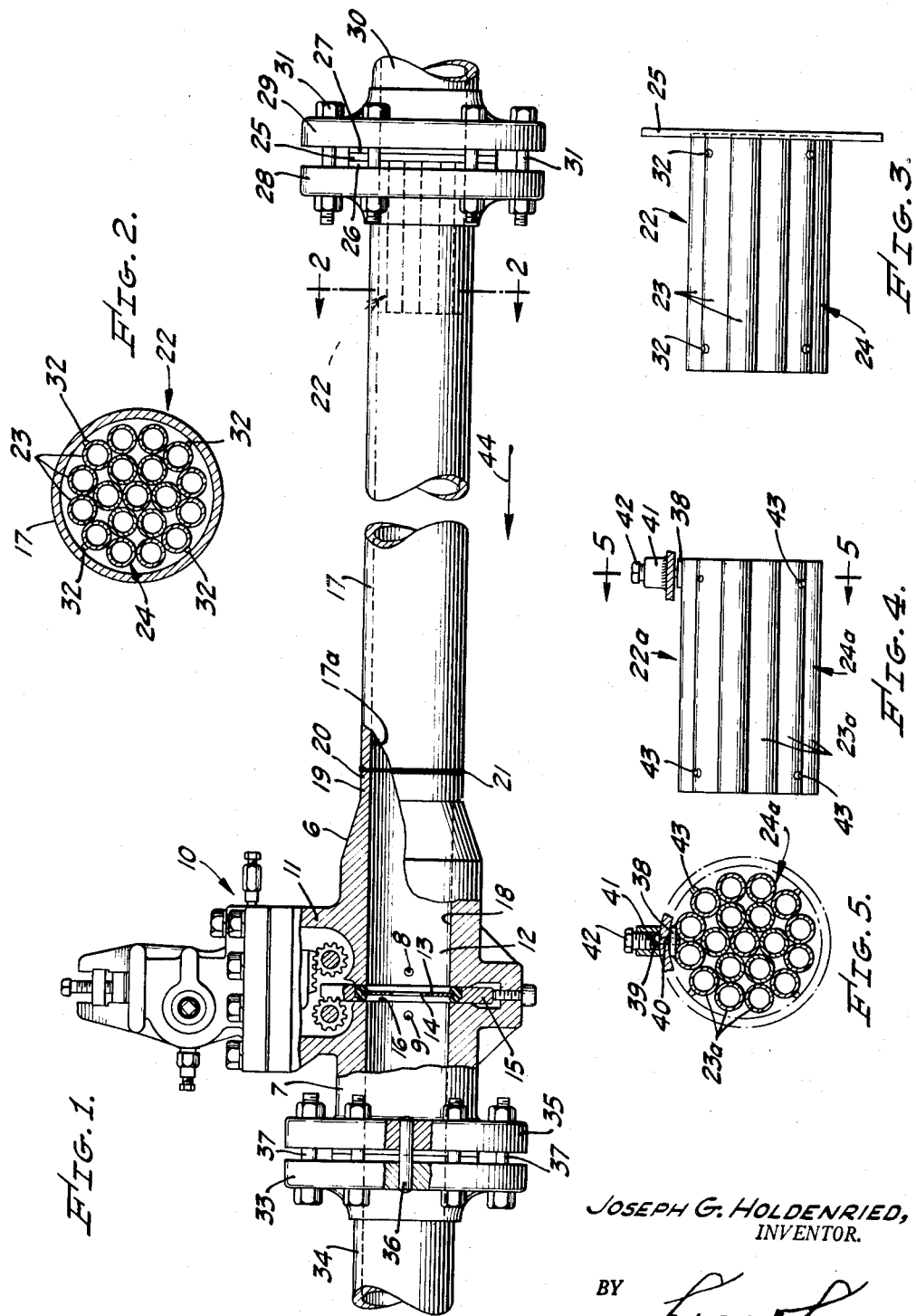
JOSEPH G. HOLDENRIED,
INVENTOR.
BY
ATTORNEYS.

Patented Sept. 14, 1954

2,688,985

UNITED STATES PATENT OFFICE 2,688,985

ORIFICE FITTING DEVICE AND STRAIGHT-
ENING VANE UNIT ASSEMBLY

Joseph G. Holdenried, Los Angeles, Calif., assignor to Daniel Orifice Fitting Company, Los Angeles, Calif., a corporation of California Application August 20, 1951, Serial No. 242,723

1 Claim. (Cl. 138—37)

This invention relates to apparatus for the measurement of flow of fluids, steam, gases, air and vapors by the differential pressure method. This invention is particularly directed to improvements over the orifice fitting devices shown in the Daniel Patents 1,965,826 and 1,996,192.

It is known that certain inaccuracies in flow measurement by orifice fitting devices are caused by faulty connection of meter tubes to orifice fitting devices. Faulty connections may produce misalignment, contraction of meter tubes by welding, weld defects such as "icicles," fins and burrs on the internal diameter of the meter tubes. Faulty connections are difficult to avoid in field installations where inadequate fabricating jigs and fixtures may be employed.

In accordance with my invention I overcome these difficulties by eliminating the flange connection between the upstream meter tube and the orifice meter device and by substituting an accurately aligned welded connection which takes place under controlled conditions in the factory and not in the field. The most advanced type of welding fixtures are employed to insure alignment, and this alignment is checked by parallel leveling and aligning instruments. After welding, a thorough micrometer inspection is made in order to be sure that the bore in the upstream meter tube and the bore in the orifice fitting device are of the same size and are accurately aligned. The upstream meter tube carries a series of straightening vanes which are fixed therein. The upstream end of the upstream meter tube is provided with the usual flange for connection to the line. The orifice fitting device, upstream meter tube, and straightening vanes thus become a unit assembly which may be installed and removed from the line for servicing, checking or repair without changing the alignment between the upstream meter tube and the orifice fitting devices.

In the drawings:

Figure 1 is a side elevation partly in section and partly broken away showing a preferred embodiment of my invention.

Figure 2 is a transverse sectional view taken substantially on the line 2—2 as shown in Figure 1.

Figure 3 is a side elevation of one form of straightening vane cluster.

Figure 4 is a side elevation of another form of straightening vane cluster.

Figure 5 is a transverse sectional view taken substantially on the line 5—5 as shown in Figure 4.

Referring to the drawings, the orifice fitting device 10 is preferably of the type shown in said Daniel patents and includes a body 11 having a flow passage 12. The ends of the flow passage are formed within oppositely extending tubular projections 6 and 7 on the body 11. An orifice plate 13 having a central opening 14 is mounted upon a plate carrier 15. The plate carrier 15 is movable to an operative position within the body slot 16 to position the orifice plate opening 14 concentrically with respect to the flow passage 12. The usual ports 8 and 9 are provided in the body 11 on opposite sides of the slot 16, and these ports are connected to metering apparatus (not shown) for measuring the rate of flow through the device 10 by the differential pressure method. Since the accuracy of the measurement of flow is known to be unfavorably influenced by turbulence of the fluid on the upstream side of the orifice plate 13, every precaution is taken to assure concentricity and alignment of the upstream meter tube 17 with respect to bore 18 of the body 11, which bore defines the flow passage 12. The bore 17a of the upstream meter tube is the same diameter as the bore 18 in the body 11. Instead of flanging the upstream end 19 of the body 11 I provide a welding neck 20 which is welded under controlled conditions in the shop to join the end 20 to the upstream meter tube 17 by means of the welded joint 21. Internal expanding welding fixtures are employed to assure concentricity, and jigs are used to prevent both parallel and axial misalignment. The joint is carefully inspected after welding to remove any burrs, icicles, sharp corners, etc. at the joint 21.

A flange member 33 which may be of conventional design is fixed to the downstream meter tube 34 and is connected to the flange member 35 by dowels 36 or by mating male and female parts in order to secure accurate alignment. The usual bolted connections 37 connect the flange members 33 and 35 and prevent their separation.

At the upstream end of the upstream meter tube 17 I provide a straightening vane assembly 22 which performs the function of minimizing turbulence of the line flow entering the meter tube 17. This straightening vane assembly 22 may comprise a plurality of parallel tubes 23 welded together in the form of a bundle 24. The tubes 23 are of the same length and the upstream ends of the outer tubes in the bundle are welded or otherwise attached to the flange ring 25. The central opening in the flange ring 25 is large enough to receive the bundle 24. The assembly 22 including the tubes and flange is assembled as a unit into the interior of the upstream meter tube 17 with the flange ring 25 interposed between annular abutments 26 and 27 provided on the flange members 28 and 29 respectively. The flange member 28 is welded to the upstream meter tube 17 and the flange member 29 is welded to the pipe 30. The usual bolted connections 31 are provided for clamping the flange members 28 and 29 against separation. Lugs 32 are provided on the tube bundle 24 for holding the bundle in concentric relationship within the interior of the upstream meter tube 17.

In the modified form of straightening vane assembly shown in Figures 4 and 5 the assembly 22a comprises a group of parallel tubes 23a assembled in the form of a bundle 24a, but the flange ring 25 is omitted. In place of the flange ring a strip 38 is welded to one or more of the outer tubes 23a and a threaded element 39 passes through an aperture 40 provided in the upstream meter tube 17 and is threaded into the strip 38. A short tubular part 41 encircles the head of the threaded element 39 and a threaded closure 42 forms a seal within the part 41. Lugs 43 on the bundle 24a maintain the bundle in concentric position within the meter tube 17. The straightening vane assembly 22a is installed within the meter tube 17 at a location upstream from the welded joint 21 but it need not be placed at the extreme upstream end of the meter tube 17. Instead the aperture 40 may be located at any desired position within the meter tube 17.

The direction of flow through the meter tube 17, flow passage 12 and meter tube 34 is in the direction of the arrow 44. When it is desired to remove the orifice fitting device 10 for servicing, inspection, maintenance or replacement the bolted connections 31 and 37 are removed to permit lateral removal of the orifice meter device 10, upstream meter tube 17 and straightening vanes 22 or 22a as a single integral unit. The apparatus between the flanges 29 and 33 may then be subjected to tests without requiring any change in the alignment between the upstream meter tube 17 and the orifice fitting device 10. After the inspection or maintenance the device 10, tube 17 and straightening vanes 22 or 22a may be replaced as a unit between the flanges 29 and 33.

Having fully described my invention, it is to be understood that I do not wish to be limited to the details herein set forth, but my invention is of the full scope of the appended claim.

I claim:

In an orifice fitting device for use between flanged ends of spaced axially aligned pipes, the combination of: a body having a bore defining a flow passage extending therethrough and having an orifice plate removably mounted in said flow passage, an upstream meter tube welded at one end to the body concentrically and in axial alignment with one end of said flow passage, the upstream meter tube having a bore of the same size as the bore defining the flow passage, a straightening vane assembly including a bundle of parallel elements fixed within the upstream meter tube near the other end, a flange ring connected to the upstream end of said bundle, a flange member on the upstream meter tube at the latter said end thereof for connection with a flanged pipe, the flange ring being clamped between the flange member and the flanged pipe, and flange means on the body at the other end of the flow passage for connection with another flanged pipe, whereby the body, upstream meter tube and straightening vane assembly may be removed as a unit from position between said pipes.

References Cited in the file of this patent

UNITED STATES PATENTS

| Number | Name | Date |
| --- | --- | --- |
| 1,965,826 | Daniel | July 10, 1934 |
| 2,448,071 | Anderson | Aug. 31, 1948 |
| 2,497,491 | Douglas | Feb. 14, 1950 |